(12) United States Patent
Chapman et al.

(10) Patent No.: US 8,276,118 B2
(45) Date of Patent: Sep. 25, 2012

(54) DEPICTING CHANGES TO STRUCTURES IN AN INTEGRATED DEVELOPMENT ENVIRONMENT

(75) Inventors: Matthew P. Chapman, Hants (GB); Andrew Simon Clement, Hampshire (GB); Helen Louise Hawkins, Hants (GB); Sian Suzanne January, Hants (GB); Matthew Alexander Webster, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/037,640

(22) Filed: Feb. 26, 2008

(65) Prior Publication Data

US 2008/0235660 A1 Sep. 25, 2008

(30) Foreign Application Priority Data

Mar. 1, 2007 (GB) .................................. 07103343.5

(51) Int. Cl.
*G06F 9/44* (2006.01)
(52) U.S. Cl. .......................... 717/113; 717/120; 717/121
(58) Field of Classification Search ........................ None
See application file for complete search history.

(56) References Cited

U.S. PATENT DOCUMENTS

| | | | | | |
|---|---|---|---|---|---|
| 3,711,863 | A | * | 1/1973 | Bloom ........................ | 714/38.1 |
| 5,428,788 | A | * | 6/1995 | Schwanke .................... | 717/120 |
| 5,428,791 | A | * | 6/1995 | Andrew et al. ............... | 717/121 |
| 5,438,676 | A | * | 8/1995 | Schwanke .................... | 717/120 |
| 5,440,742 | A | * | 8/1995 | Schwanke .................... | 717/120 |
| 5,485,621 | A | * | 1/1996 | Schwanke .................... | 717/121 |
| 5,530,869 | A | * | 6/1996 | Salle ........................... | 717/113 |
| 5,706,502 | A | * | 1/1998 | Foley et al. .................. | 717/120 |
| 5,790,863 | A | * | 8/1998 | Simonyi ...................... | 717/113 |
| 5,819,092 | A | * | 10/1998 | Ferguson et al. ............. | 717/113 |
| 5,835,769 | A | * | 11/1998 | Jervis et al. .................. | 717/113 |
| 5,898,872 | A | * | 4/1999 | Richley ....................... | 717/121 |
| 6,182,274 | B1 | * | 1/2001 | Lau ............................. | 717/104 |
| 6,223,343 | B1 | * | 4/2001 | Hopwood et al. ............ | 717/101 |
| 6,256,773 | B1 | * | 7/2001 | Bowman-Amuah ......... | 717/121 |
| 6,298,476 | B1 | * | 10/2001 | Misheski et al. ............. | 717/101 |
| 6,473,895 | B1 | * | 10/2002 | Lopes et al. ................. | 717/128 |
| 6,539,390 | B1 | * | 3/2003 | Kiczales et al. ............. | 1/1 |
| 6,609,128 | B1 | * | 8/2003 | Underwood ................. | 707/610 |
| 7,086,046 | B2 | * | 8/2006 | Barsness et al. ............. | 717/152 |
| 2002/0060566 | A1 | * | 5/2002 | Debbins et al. .............. | 324/307 |
| 2002/0199170 | A1 | * | 12/2002 | Jameson ...................... | 717/120 |

(Continued)

OTHER PUBLICATIONS

Grundy, John. "Aspect-oriented Requirements Engineering for Component-based Software Systems" IEEE 1999 <http://ieeexplore.ieee.org/xpls/abs_all.jsp?arnumber=777988&tag=1> all pages.*

(Continued)

*Primary Examiner* — Thuy Dao
*Assistant Examiner* — Samuel Hayim
(74) *Attorney, Agent, or Firm* — Yudell Isidore Ng Russell PLLC (57) ABSTRACT

Operating an integrated development environment in a data processing system comprising running a source code editor, displaying source code in a graphical interface of the source code editor, displaying at least one cross-reference marker, the at least one cross-reference marker indicating crosscutting in the source code, receiving an input, changing one or more cross-reference markers, and highlighting the one or more changed cross-reference marker.

15 Claims, 7 Drawing Sheets

U.S. PATENT DOCUMENTS

| | | | | |
|---|---|---|---|---|
| 2002/0199173 | A1* | 12/2002 | Bowen | 717/129 |
| 2003/0009481 | A1* | 1/2003 | Greenberg | 707/200 |
| 2003/0023961 | A1* | 1/2003 | Barsness et al. | 717/152 |
| 2004/0172622 | A1* | 9/2004 | Francis | 717/121 |
| 2007/0185777 | A1* | 8/2007 | Pyle et al. | 705/26 |
| 2008/0235660 | A1* | 9/2008 | Chapman et al. | 717/113 |

OTHER PUBLICATIONS

Chapman Matt et al. "Develop Aspect-oriented Java applications with Eclipse and AJDT" IBM developerWorks, Sep. 2004 <http://www.ibm.com/developerworks/java/library/j-ajdt/> all pages.*

Miller Sandra Kay. "Aspect-Oriented Programming Takes Aim at Software Complexity" Apr. 2001, Computer, vol. 34, Issue 4, pp. 18-21.*

Eclipse, "AJDT: AspectJ Development Tools", Eclipse. org, 2006, <http://www.eclipse.org/ajdt/whatsnew15/> pp. 1-3.*

Deppak Dahiya et al., "Understanding Requirements: Aspect Oriented Software Development", IEEE, 2006, <http://ieeexplore.ieee.org/stamp/stamp.jsp?tp=&arnumber=4020184> pp. 1-6.*

Stefen Hanenberg et al., "From Aspect-Oriented Design to Aspect-Oriented Programs: Tool-Supported Translation of JPDDs Into Code", ACM, Mar. 2007, <http://delivery.acm.org/10.1145/1220000/1218570/p49-hanenberg.pdf> pp. 1-14.*

Kersten, M. et al (including Matt Chapman), "Lessons learned building tool support for AspectJ", AOSD '06 Fifth International Conference on Aspect-Oriented Software Development (Mar. 2006), http://kerstens.org/mik/publications/aspectj-aosd2006.pdf.

* cited by examiner

DEPICTING CHANGES TO STRUCTURES IN AN INTEGRATED DEVELOPMENT ENVIRONMENT

FIELD OF THE INVENTION

This invention relates to operating a data processing system, and more particularly operating an integrated development environment in a data processing system.

BACKGROUND DESCRIPTION

When considering a large computer program where some features have been written using aspect-oriented techniques, the nature of current aspect-oriented languages, such as AspectJ™ of the Eclipse Foundation is such that refactoring in this kind of code base can change the location and number of places where a given aspect applies (or matches). As a result, the feature encapsulated by the aspect may no longer be working correctly. It can be complex and time consuming to work out how refactoring has affected the aspects in a project. Users may also not be aware that their changes have had an effect on the aspect.

An existing solution is the crosscutting comparison view provided by AJDT, the AspectJ™ Development Tools. This crosscutting comparison can be used to compare a saved set of crosscutting relationships with another saved set, or with the current state of a project. There are two main drawbacks to this solution. First the user has to be aware that a piece of work they are about to perform may affect an aspect. Second if there are a lot of changes they can be difficult to interpret.

Currently, in an integrated development environment such as Eclipse and AJDT, when developing applications in an aspect-oriented language a user is shown where code is affected by an aspect. This takes the form of an icon in the left-hand margin (gutter) of the editor window. But in response to changes in the code these icons may appear and disappear, without the user noticing such a change.

SUMMARY

According to one embodiment of the present invention provides a method of operating a data processing system comprising running a source code editor, displaying source code in a graphical interface of the source code editor, displaying one or more cross-reference markers, the or each cross-reference marker indicating crosscutting in the source code, receiving an input, changing one or more cross-reference markers, and highlighting the or each changed cross-reference marker.

According to another embodiment of the present invention provides a data processing system comprising a user interface, a processor for running a source code editor and a graphical interface for displaying source code of the source code editor, the graphical interface arranged to display one or more cross-reference markers, the or each cross-reference marker indicating crosscutting in the source code, the user interface arranged to receive an input, the source code editor arranged to change one or more cross-reference markers, and the graphical interface arranged to highlight the or each changed cross-reference marker.

According to yet another embodiment of the present invention provides a computer program product on a computer readable medium for operating a data processing system comprising instructions for running a source code editor, displaying source code in a graphical interface of the source code editor, displaying one or more cross-reference markers, the or each cross-reference marker indicating crosscutting in the source code, receiving an input, changing one or more cross-reference markers, and highlighting the or each changed cross-reference marker.

In one embodiment of the invention, it is possible to provide a user with a simple and efficient method of detecting changes in crosscutting in source code when using an integrated development environment. In one embodiment of the invention, the integrated development environment enhances static markers with new delta markers to indicate when a static marker has appeared or disappeared. An icon including a plus sign is used to signify additional advice in effect. Similarly, an icon including a minus sign is used to signal advice no longer in effect. The icons allow the user to immediately see when they have made a change in a file that has also changed the effect an aspect has on that file.

Advantageously, an embodiment of the invention offers additional capabilities allowing the user to select the icon and navigate to the advice. A user can hover over the icon with a mouse to see helpful text such as the advice definition or the javadoc associated with the advice or aspect. The user can also accept the changes after reviewing them. For example, if the project were a Concurrent Versions System (CVS) project, a CVS commit operation would remove the markers for the files committed and reset the state against which new changes are compared. Advanced users or those not using CVS can also accept the changes themselves. After acceptance, the delta markers would then disappear.

In one example of an embodiment, the invention works by creating a crosscutting map (as a background task). This map is updated each time a project is compiled, and contains details of all crosscutting relationships present in the project. Each crosscutting relationship consists of a source element such as a "before advice" statement in an advice, a target element such as a method in a Java™ class, and a relationship type such as "advises" or "advised by". This map file, following user input, can then be compared with the previously stored crosscutting map file. The differences between the two files provide a list of added relationships and a list of removed relationships. These lists can be mapped to the appropriate source code locations and the appropriate highlighting can be added to the markers in the editor gutter in these locations. Using the example of a CVS project, the crosscutting map file would be created on a CVS checkout and updated on CVS update and commit operations. When a project is compiled, the crosscutting relationships would be compared with the previous map file and the appropriate highlighting added.

An embodiment of invention has specific implementation when the source code includes aspects according to an aspect-oriented language and the cross-reference markers indicate aspect matching. However, the invention is a generic solution that could be applied to any IDE or editor where a small change can have a wide-reaching effect, for example, when cascading style sheets in HTML or MACROs in C.

BRIEF DESCRIPTION OF THE DRAWINGS

Preferred embodiments of the present invention will now be described, by way of example only, with reference to the accompanying drawings, in which.

DETAILED DESCRIPTION

Figure 1:
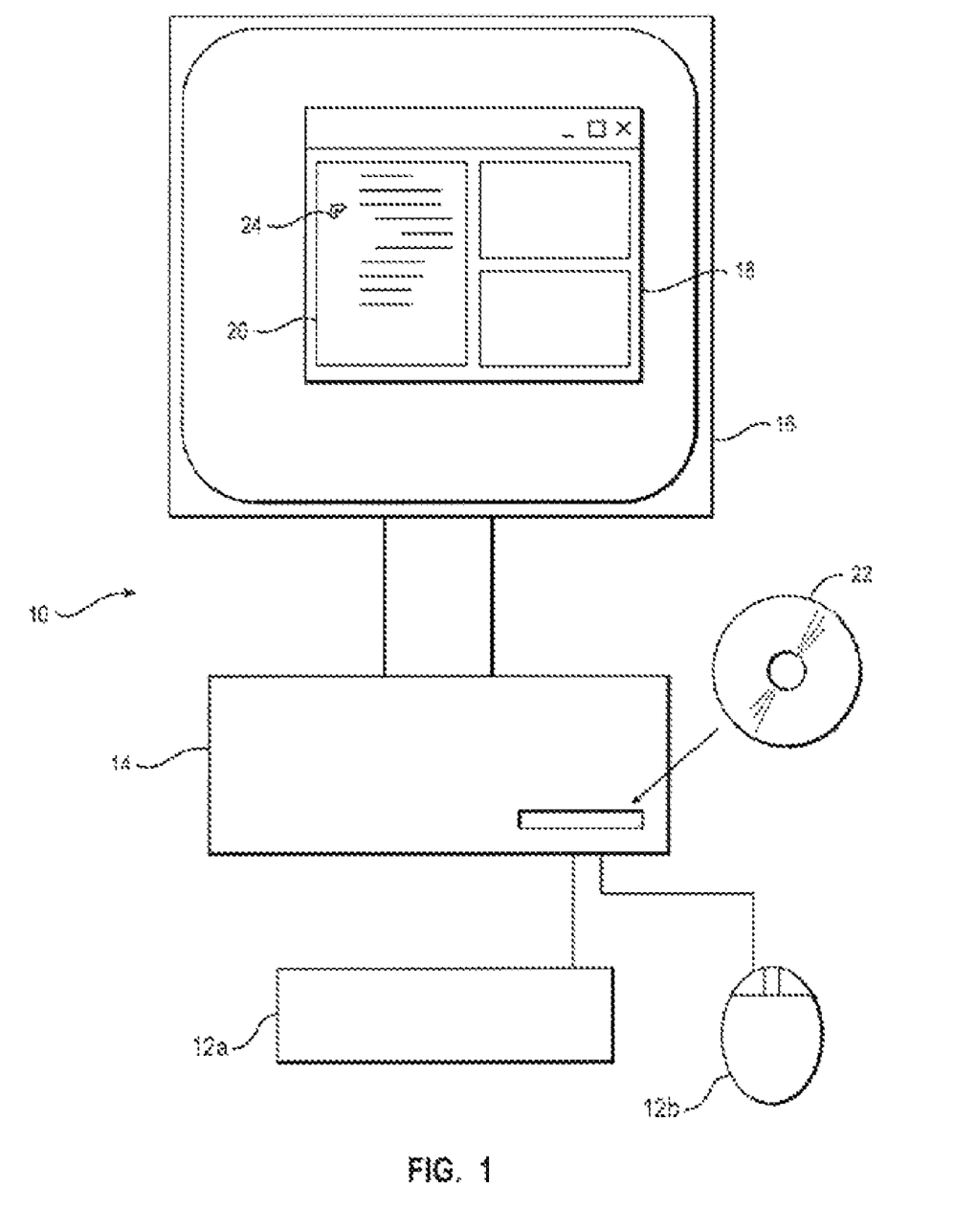
FIG. 1 is a schematic diagram of a data processing system in which an embodiment of the present invention may be practiced.

FIG. 1 shows an example of a data processing system 10 comprising user interface devices 12, being a keyboard 12a and a mouse 12b, a processor 14 for running a source code editor and a graphical interface 16 for displaying source code of the source code editor. The processor 14 is running an integrated development environment 18 which includes the source code editor 20. A computer readable medium, being a CD-ROM 22 carries a computer program product with instructions for operating the data processing system 10.

A user of the system 10 can enter new source code via the keyboard 12a while working on a project, which may be a new project or may be an amendment to a previously existing project. The integrated development environment 18 is a tool for creating and/or amending source code of a computer program. The primary tool of the integrated development environment 18 is the source code editor 20, but other functions such as error checking and project management are provided by the integrated development environment 18.

The graphical interface 16 is arranged to display cross-reference markers 24, each cross-reference marker 24 indicating crosscutting in the source code. In some types of computer programming, crosscutting is a feature of the structure of the programming language/grammar being used. For example, in aspect oriented programming, in addition to the conventional source code of multiple objects, source code for one or more aspects is provided.

AspectJ is an aspect oriented extension of JAVA™, for example. An aspect is not called by another part of a program in a conventional sense, but defines itself when it will operate. Each aspect will define criteria under which the aspect executes. When these criteria apply (or match) within the running of the program, then the aspect will operate. For each aspect, there will be multiple positions within the body of the source code when the aspect could or would be matched. This crosscutting is indicated by the cross-reference marker 24, which, in the example of FIG. 1, shows where in the source code, shown by the editor 20, a specific aspect matches.

It will be appreciated by those skilled in the art that when changes to the main body of source code, or to an aspect, are made then the crosscutting within the source code may well change. For example, a slight change in the conditions within an aspect which define whether a match occurs may add multiple new crosscutting instances within the program and also lead to previous crosscutting instances no longer applying. Similarly any change within the main body of the source code may lead to a match to an aspect which no longer applies or, indeed, one or more new matches to existing aspects may now apply.

The integrated development environment 18 is configured so that when the user interface 12 is arranged to receive an input that results in the source code editor 20 having to change one or more cross-reference markers 24, the graphical interface 16 is arranged to highlight each changed cross-reference marker 24. The complex nature of the crosscutting relationships within an aspect oriented program is such that the user's ease of working is enhanced by the integrated development environment 18 monitoring the changes of the crosscutting relationships within the source code. Following receipt of an input, the integrated development environment 18 determines new crosscutting in the source code and illustrates the changes from the previous crosscutting relationships within the source code.

The steps of changing one or more cross-reference markers and highlighting each changed cross-reference marker include the step of deleting a cross-reference marker and highlighting the deleted cross-reference marker. The highlighting can include a symbol indicating whether the changed cross-reference marker is an addition or deletion. This symbol allows the user to keep track of the type of change highlighted by the integrated development environment 18. A symbol such as a plus symbol may be used to indicate the addition of a new matching instance and a minus symbol may be used to indicate the deletion of an existing matching instance.

Figure 2A:
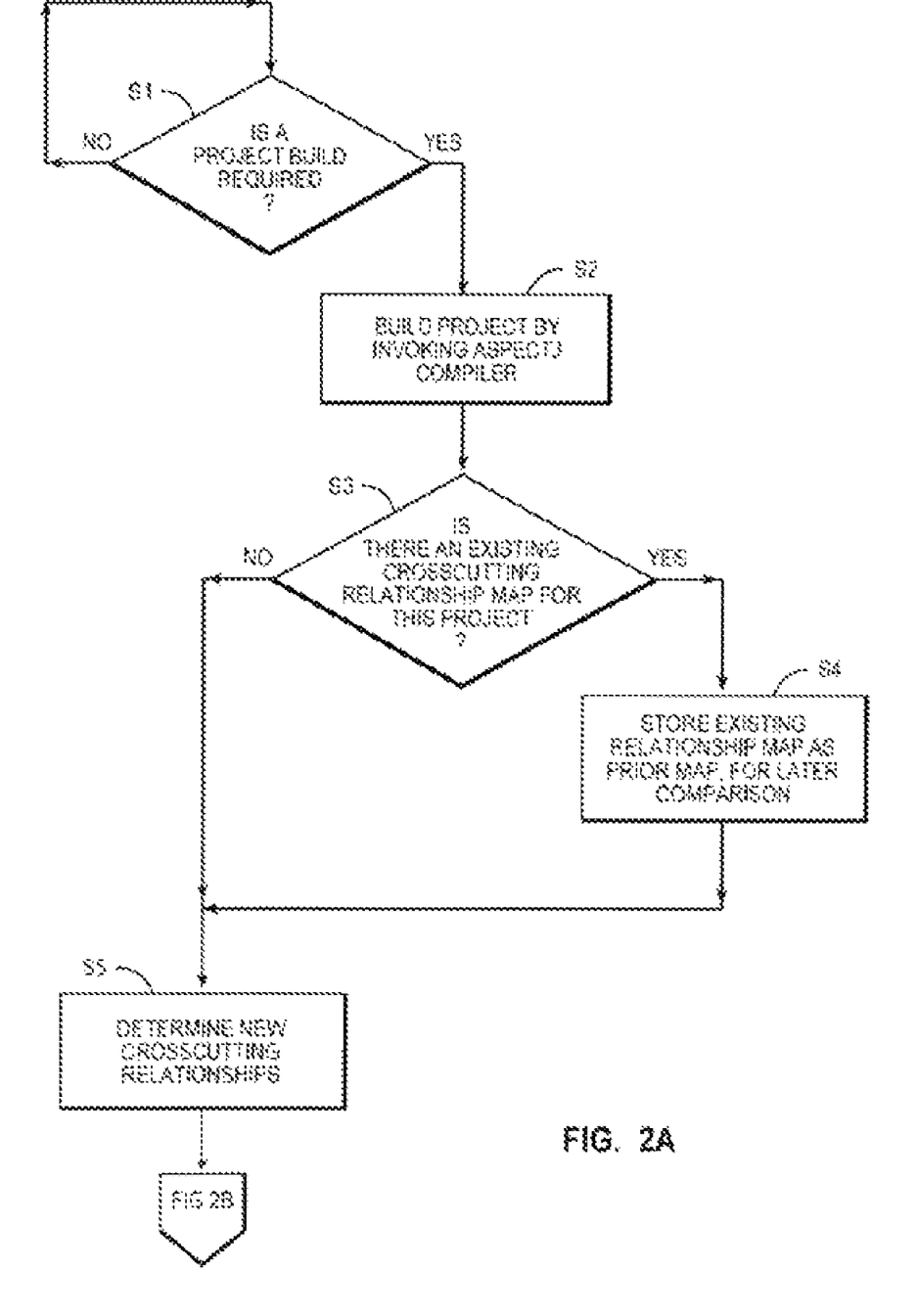
FIGS. 2a and 2b are corresponding sections of a flowchart of a method of operating the data processing system in accordance with an illustrative embodiment.
Figure 2B:
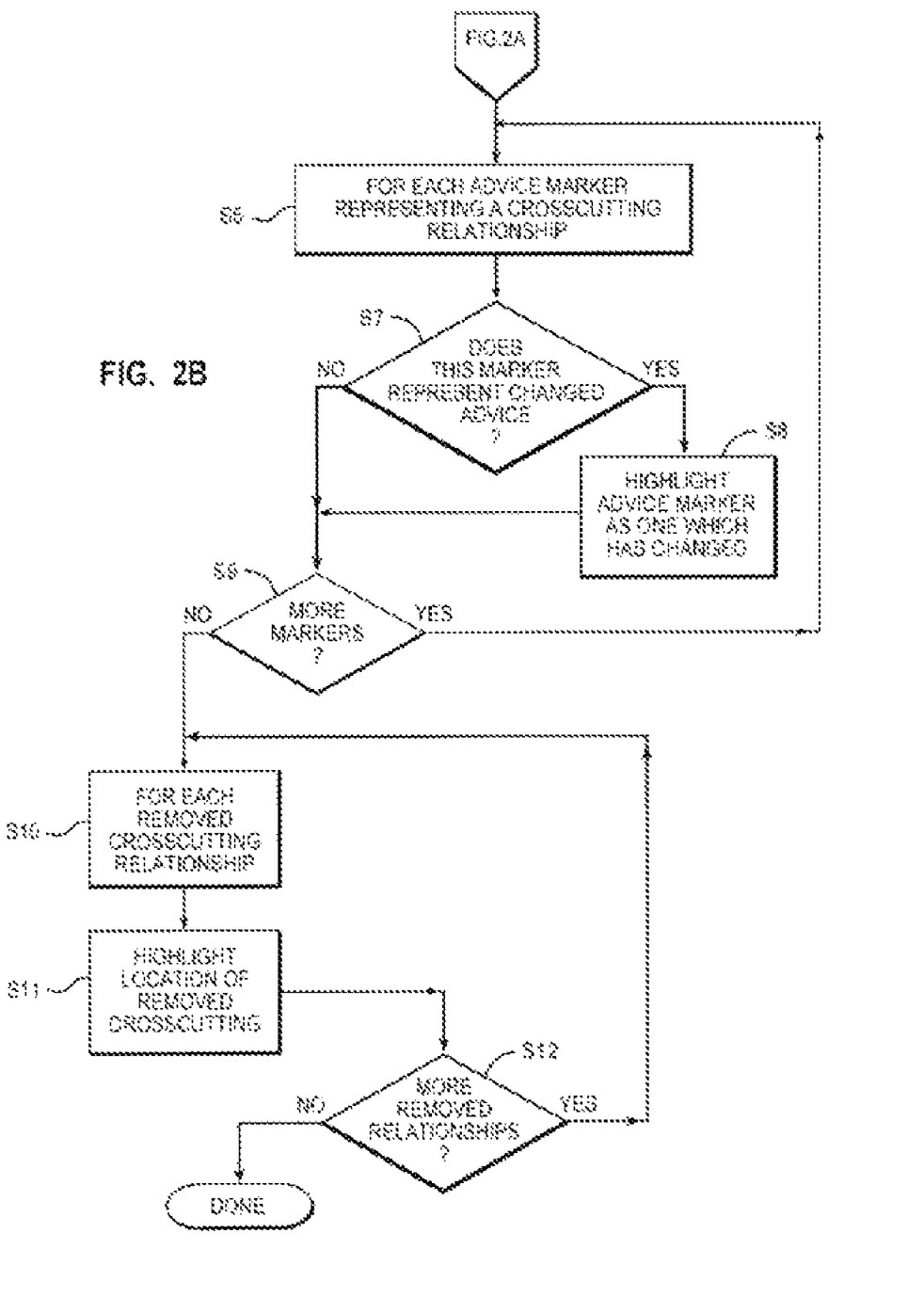

One embodiment of the method of operating the system of FIG. 1 is shown in the flowchart of FIG. 2. The source code editor 20 is being run and source code is displayed on the graphical interface 16 that is showing the editor 20. Various cross-reference markers 24 are displayed, which illustrate the crosscutting within the source code. Once input has been received that has changed the source code the processor 14 checks whether a project build is required, in step S1. If a project build is required, then a suitable complier will build the project, as shown at step S2. Once the project has been built, the processor 14 determines if a map exists that defines the current crosscutting relationships within the source code of the project, at step S3. If such a map does exist, then the existing relationship map is saved and stored as a prior map for later comparison at step S4.

The next stage is the step S5, in which the determination of the crosscutting relationships within the built project is made. Once the determination has been completed, the procedure moves to step S6, where a repeating process is begun for each of the cross-reference markers that represent a crosscutting relationship within the source code. At step S7, a first marker is checked to determine whether the first marker is one that has changed from the before build status of the source code. If the marker has changed, then the procedure moves to step S8, wherein the specific cross-reference marker that has changed is highlighted as a changed cross-reference marker, with a suitable symbol such as a plus sign to indicate that the cross-reference marker being highlighted is a new marker.

At step S9 a check is made to determine whether further cross-reference markers exist; if there are, then the procedure returns to step S6 and the steps S7 to S9 are repeated for each of the other cross-reference markers within the built project. Once all of the markers have been examined and highlighted as appropriate, then the procedure moves to step S10. This part of the process identifies those cross-reference markers that have been removed. At step S10 the processor 14 running the integrated development environment refers back to the previous crosscutting data for the last build and checks to determine whether each of the old cross-reference markers are still present. At step S11, the first deleted cross-reference marker is highlighted with a symbol such as a minus symbol to indicate the cross-reference marker is a deletion. At step S12 a check is made to determine whether there are further removed crosscutting relationships between the two builds of the project, and, if there are, then the process returns to step S10. If not, then the procedure terminates.

Figure 3:
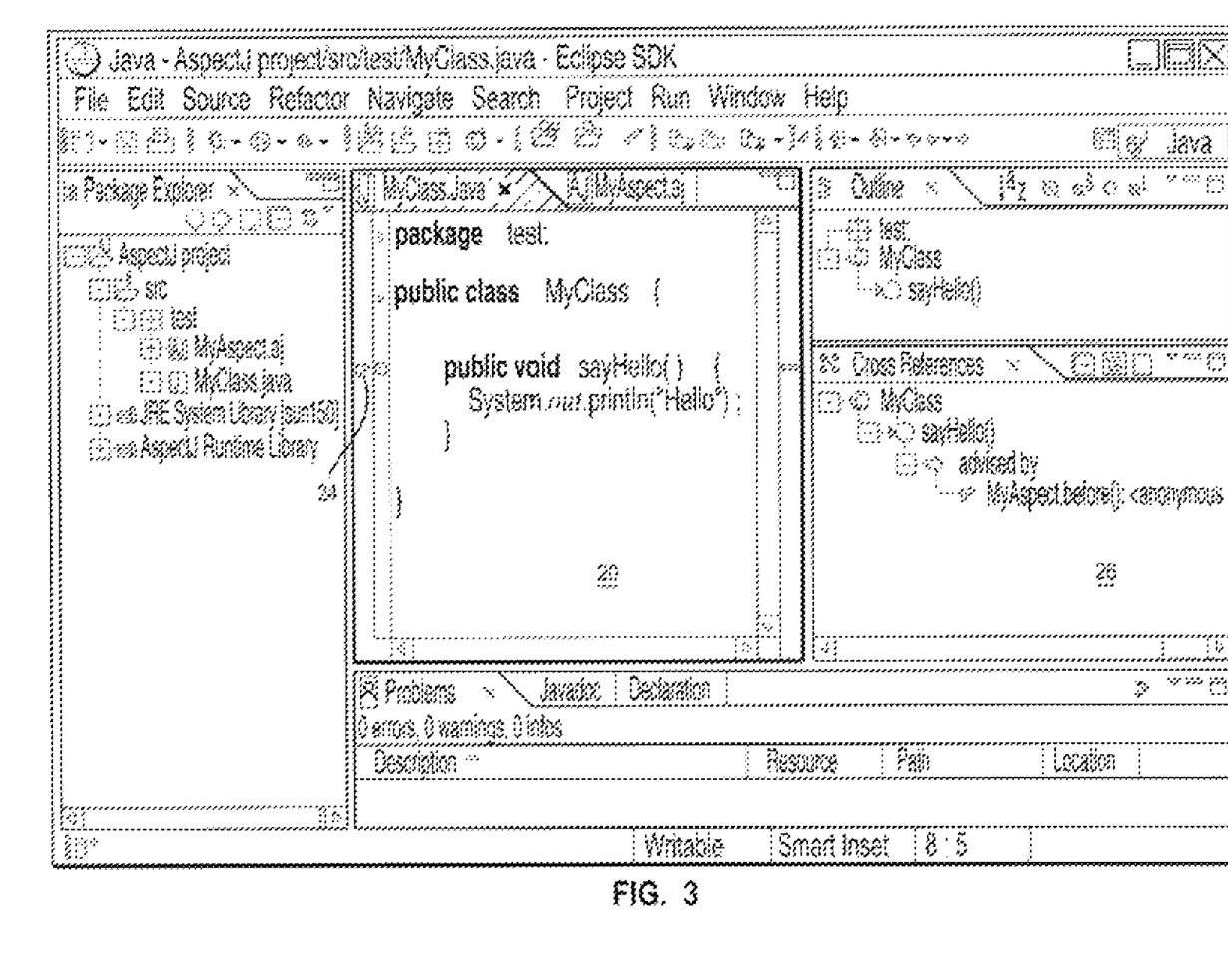
FIGS. 3 through 6 are illustrative screenshots of an embodiment of the present invention of an integrated development environment.

FIG. 3 is a screenshot of an example of an embodiment of the present invention showing the integrated development environment Eclipse with the AspectJ Development Tools (AJDT) installed. The cross-references view 26 on the right is provided by AJDT to show the crosscutting relating to whatever is shown in the editor 20, and this is summarised by the arrow cross-reference marker 24 in the left-hand margin of the editor. Different arrows are used to indicate different types of advice such as "before", "after", or "around" advice. In the example of source code shown in the source code editor view 20, the text "sayHello( )" is advised by MyAspect.before( ), as shown in the cross-references view 26. This indicates that the criteria defining the functioning of the aspect MyAspect.before( ) matches the structure defined by the source code "sayHello( )".

Figure 4:
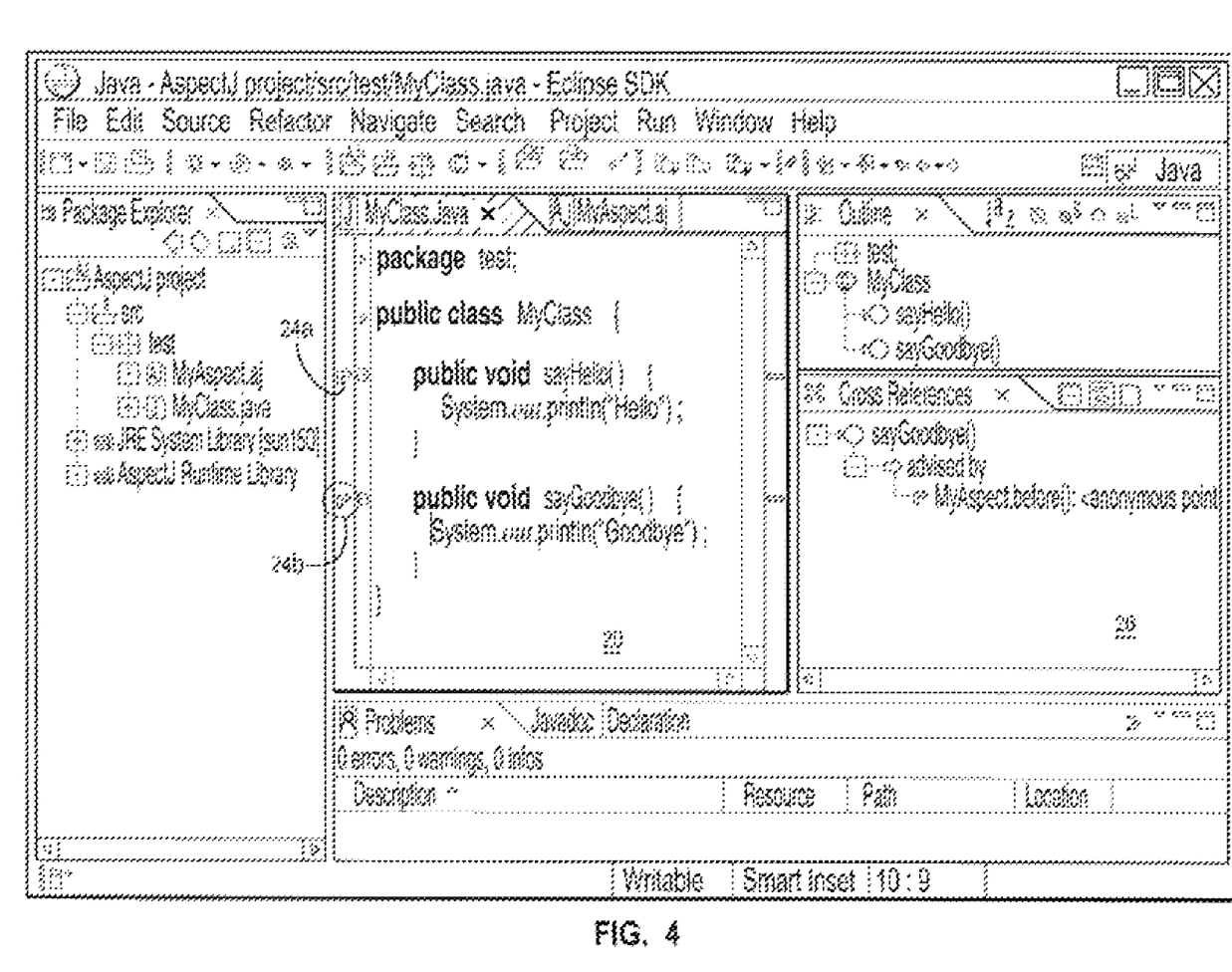

Following user input, FIG. 4 is a screenshot of an example of an embodiment of the invention after a method has been added to the class currently shown in the source code editor 20, which is being affected by the existing aspect. The method "sayGoodbye( )" has been added to the current source code and this also matches the criteria of the aspect MyAspect.before( ). In this embodiment of the invention, the cross-reference marker 24b is highlighted with a unique background to indicate that this crosscutting relationship is one which has just changed. The originally existing marker 24a is unchanged.

To illustrate the highlighting more clearly, a circle has been shown around the changed marker 24b, but any suitable method of highlighting can be used. The comparison, to which the highlighting relates, is performed against the previous state of the project. It is also possible for the user to perform the comparison against other states of the project, such as ones explicitly defined by the user, or at other "significant" points in time, such as when the project is checked out from a library control system such as CVS.

Figure 5:
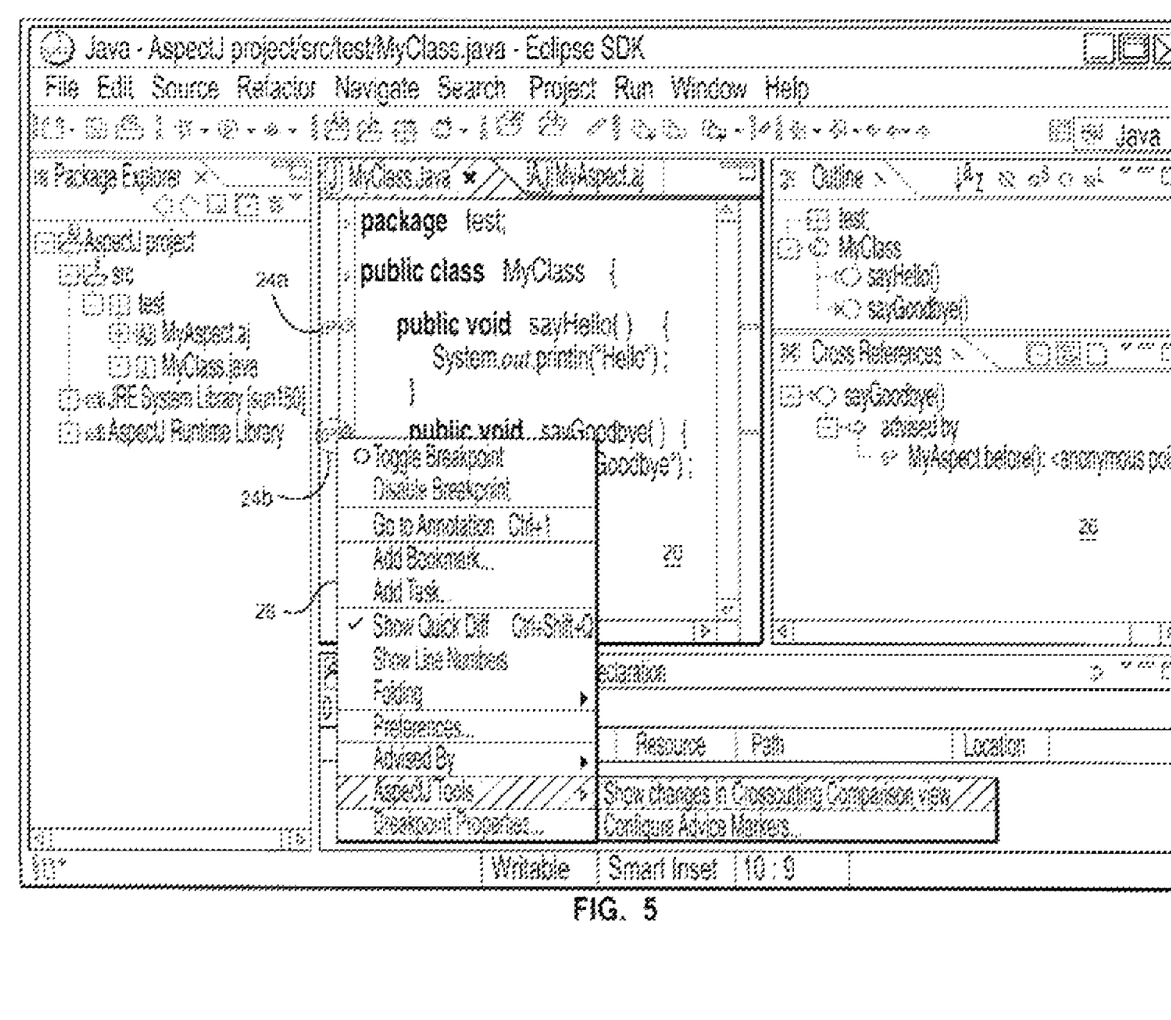
Figure 6:
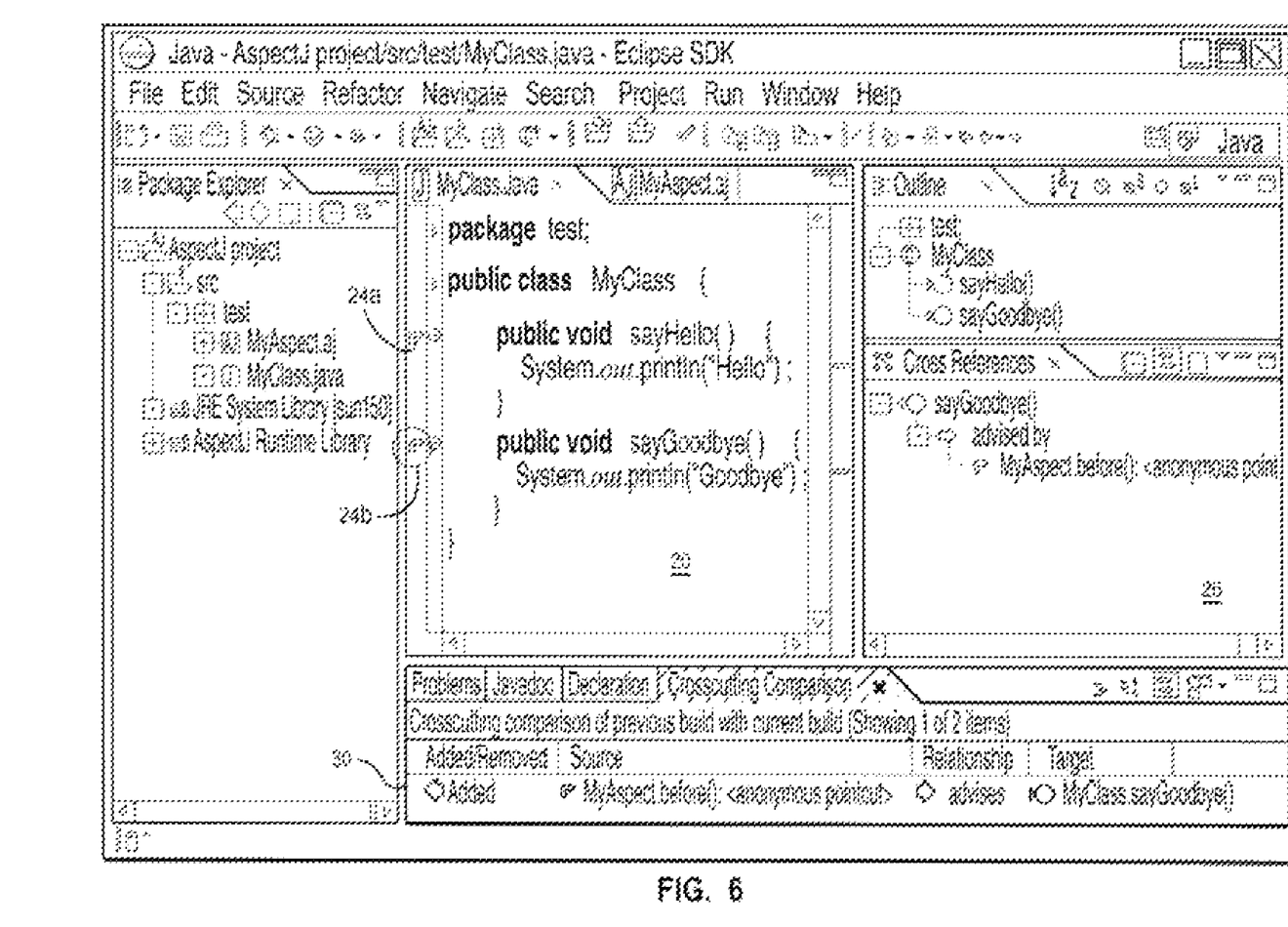

In one embodiment, the user has the option to ascertain further information about the highlighting shown in the source code editor 20. FIG. 5 is an exemplary screenshot that shows a context menu 28 that will result from the user right-clicking on the cross-reference marker 24b. AJDT already provides the ability to jump to the advice (via the "Advised By" sub-menu), and here this embodiment of the invention provides an additional option "Show changes in Crosscutting Comparison view". Selecting this option results in the screenshot shown in FIG. 6, where the view 30 is now used to show the details for all the crosscutting relationships which have been highlighted as changed.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of operating a data processing system comprising:
   the data processing system running a source code editor;
   displaying a source code of a project in a graphical interface of the source code editor;
   displaying at least one cross-reference marker, the at least one cross-reference marker indicating crosscutting in the source code;
   receiving an input to change the source code;
   the data processing system determining if a new project build is required;
   in response to determining a new project build is required, building the project;
   changing at least one cross-reference marker in response to receiving the input to change the source code;
   highlighting the at least one changed cross-reference marker, and including with the highlighting a symbol that enables tracking of a type of change being highlighted by the highlighting, wherein the symbol provides an indication whether the at least one changed cross-reference marker is an addition or deletion, wherein a plus symbol is used to indicate the addition of a new cross-reference marker and a minus symbol is used to indicate the deletion of a cross-reference marker;
   determining whether there is an existing map of crosscutting in the source code; and
   in response to determining an existing map exists, saving the existing map as a prior map.

2. The method of claim 1 further comprising:
   generating a map of crosscutting in the source code; and
   comparing a current state of the project against one or more prior states of the project.

3. The method of claim 1 further comprising:
   responsive to receipt of the input to change the source code, determining new crosscutting in the source code.

4. The method of claim 1, wherein the source code includes a plurality of aspects according to an aspect-oriented language, and wherein the at least one cross-reference marker indicates aspect matching.

5. The method of claim 1, wherein the changing the at least one cross-reference marker and the highlighting the at least one changed cross-reference marker includes deleting a cross-reference marker and highlighting the deleted cross-reference marker.

6. A data processing system comprising:
one or more user interface devices,
a processor; and
a source code editor executing on the processor having a logic embodied therein that:
displays source code of a project in a graphical interface of the source code editor;
displays at least one cross-reference marker, the at least one cross-reference marker indicating crosscutting in the source code;
receives an input to change the source code;
determines if a new project build is required;
in response to determining a new project build is required, builds the project;
change the at least one cross-reference marker in response to receiving the input to change the source code;
highlights the at least one changed cross-reference marker and includes with the highlighting a symbol that enables tracking of a type of change being highlighted by the highlighting, wherein the symbol provides an indication whether the at least one changed cross-reference marker is an addition or deletion, wherein a plus symbol is used to indicate the addition of a new cross-reference marker and a minus symbol is used to indicate the deletion of a cross-reference marker;
determines whether there is an existing map of crosscutting in the source code; and
in response to determining an existing map exists, saving the existing map as a prior map.

7. The system of claim 6, wherein the source code editor further comprising logic that:
generates a map of crosscutting in the source code; and
compares a current state of the project against one or more prior states of the project.

8. The system of claim 6, wherein the source code editor further comprising logic that:
responsive to receipt of the input to change the source code, to determine new crosscutting in the source code.

9. The system of claim 6, wherein the source code includes a plurality of aspects according to an aspect-oriented language, and wherein the at least one cross-reference marker indicates aspect matching.

10. The system of claims 6, wherein the source code editor further comprising logic that:
deletes the cross-reference marker; and
highlights the deleted cross-reference marker.

11. A computer program product comprising a computer readable storage memory having computer instructions embodied therein for operating a data processing system, the instructions comprising computer instructions for:
running a source code editor;
displaying a source code of a project in a graphical interface of the source code editor;
displaying at least one cross-reference marker, the at least one cross-reference marker indicating crosscutting in the source code;
receiving an input to change the source code;
the data processing system determining if a new project build is required;
determining a new project build is required, building the project;
changing at least one cross-reference marker in response to receiving the input to change the source code;
highlighting the at least one changed cross-reference marker and including with the highlighting a symbol that enables tracking of a type of change being highlighted by the highlighting, wherein the symbol provides an indication whether the at least one changed cross-reference marker is an addition or deletion, wherein a plus symbol is used to indicate the addition of a new cross-reference marker, and a minus symbol is used to indicate the deletion of a cross-reference marker;
determining whether there is an existing map of crosscutting in the source code; and
in response to determining an existing map exists, saving the existing map as a prior map.

12. The computer program product of claim 11, further comprising computer instructions for:
generating a map of crosscutting in the source code; and
comparing a current state of the project against one or more prior states of the project.

13. The computer program product of claim 11, further comprising computer instructions for:
responsive to receipt of the input to change the source code, determining new crosscutting in the source code.

14. The computer program product of claims 11, wherein the source code includes a plurality of aspects according to an aspect-oriented language, and wherein the at least one cross-reference marker indicates aspect matching.

15. The computer program product of claim 11, wherein:
the computer instructions for changing the at least one cross-reference marker and highlighting the at least one changed cross-reference marker further include computer instructions for deleting a cross-reference marker and for highlighting the deleted cross-reference marker.

* * * * *